(12) United States Patent  
Moczydlowski

(10) Patent No.: US 8,782,034 B1  
(45) Date of Patent: Jul. 15, 2014

(54) UTILIZING INFORMATION ABOUT USER-VISITED PLACES TO RECOMMEND NOVEL SPACES TO EXPLORE

(75) Inventor: Wojciech Moczydlowski, Forest Hills, NY (US)

(73) Assignee: Google Inc., Mountain View, CA (US)

( * ) Notice: Subject to any disclaimer, the term of this patent is extended or adjusted under 35 U.S.C. 154(b) by 4 days.

(21) Appl. No.: 13/212,088

(22) Filed: Aug. 17, 2011

(51) Int. Cl.
*G06F 17/30* (2006.01)

(52) U.S. Cl.
USPC .............................. 707/713; 707/706; 707/751

(58) Field of Classification Search
USPC .................................. 707/706, 713, 751, 736
See application file for complete search history.

(56) References Cited

U.S. PATENT DOCUMENTS 7,082,365 B2 * 7/2006 Sheha et al. .................. 701/426
7,720,844 B2 * 5/2010 Chu et al. ..................... 707/724
2007/0168208 A1 * 7/2007 Aikas et al. ....................... 705/1
2011/0184960 A1 * 7/2011 Delpha et al. ................ 707/754

OTHER PUBLICATIONS

Zheng et al., "Recommending Friends and Locations Based on Individual Location History", published by ACM Transactions on the Web, vol. 5, No. 1, Article 5 on Feb. 2011, pp. 1-44.*
Machine translated Japanese Patent No. 2010-061600 issued to Kamimaeda et al. ; Published Date Mar. 18, 2010; 30 pages.*

* cited by examiner

*Primary Examiner* — Monica Pyo
(74) *Attorney, Agent, or Firm* — McDermott Will & Emery LLP

(57) ABSTRACT

A system and machine-implemented method for recommending a point of interest includes the steps of obtaining interest information indicating an interest of each of multiple users for a multiple points of interest, obtaining attributes for constraining a search of the multiple points of interest, identifying a point of interest that satisfies the attributes and has the least similarity to the interest information for a first user, and providing information about the identified point of interest for display to the first user.

26 Claims, 3 Drawing Sheets

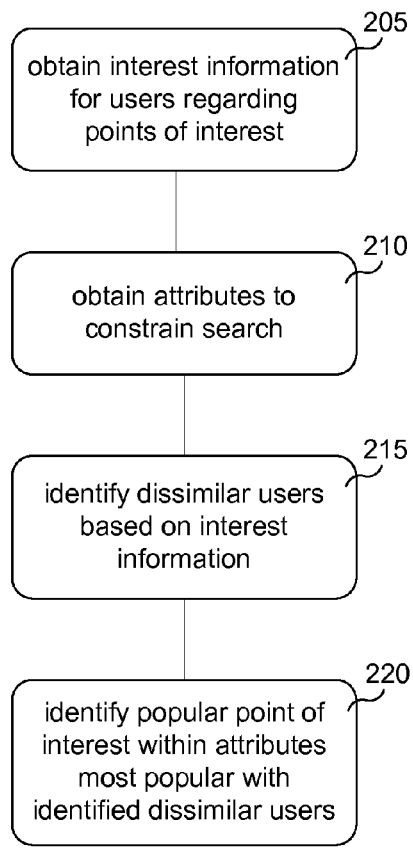
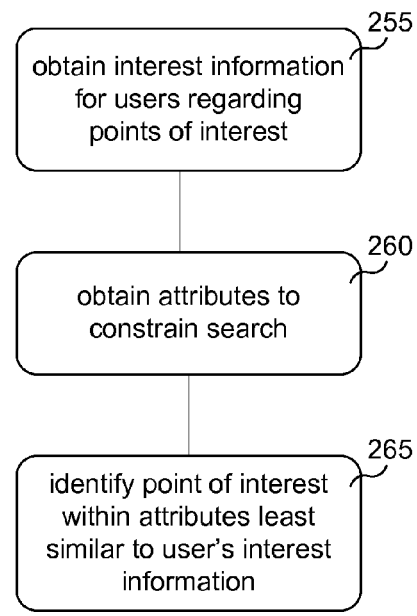
FIG. 2A
FIG. 2B

US 8,782,034 B1

UTILIZING INFORMATION ABOUT USER-VISITED PLACES TO RECOMMEND NOVEL SPACES TO EXPLORE

BACKGROUND

Internet-based map services have been available for many years, offering functionality including displaying graphical maps (whether image-, line-, or vector-based maps), locating locations by address, and providing travel directions (often illustrated on the above graphical maps). Some map services also maintain a database of points of interest (such as restaurants, stores, and tourist destinations), their respective locations, and other information regarding these points of interest. Searches may be run against this database to identify particular points of interest for a user. For example, a user of a map service may submit a text-based search query for "that restaurant, el cerrito, ca", resulting in a list of restaurants serving Thai food in or about El Cerrito, Calif., which may also be listed in shown on a graphical map display.

Although the above search may be performed using a conventional index-based search engine, map services have also made use of recommender systems, either instead of or in conjunction with a conventional index-based search engine (e.g., by performing ranking of search results). A popular technique for recommender systems is known as collaborative filtering. An underlying assumption in conventional collaborative filtering systems is that users who have agreed in the past will tend to agree in the future. Collaborative filtering techniques rely upon "interest information" (sometimes referred to as "taste information" or "ratings information") collected from a plurality of users regarding a plurality of items, such as points of interest. In user-based collaborative filtering, users or groups of users similar to a particular user of interest are identified, and the interest information collected by these users or groups of users are used to predict which items are of interest for the particular user of interest. In item-based collaborative filtering, the similarity of items is determined identified based on the interest information, and is used to suggest items for a particular user of interest. Many other forms and variations of collaborative filtering are known to those skilled in the art.

One issue with conventional recommender systems is that they only take into account the interests of similar users or look to similar items, based on items preferred or selected by a particular user of interest. This tends to have an effect where the user's previously indicated interests reinforce the selection of similar items. For example, if the user has previously indicated an interest for Mexican restaurants, conventional recommender systems will recommend more restaurants serving Mexican or similar food. Accordingly, users may fail to be introduced to and learn that they enjoy items outside of their previously indicated interests.

SUMMARY

The disclosed subject matter relates to a machine-implemented method for recommending a point of interest that includes obtaining interest information for a plurality of users, the interest information including information indicating an interest of each user for a plurality of points of interest, and the plurality of users including a first user. According to the method, a plurality of attributes for constraining a search of the plurality of points of interest is obtained, a point of interest, from among the plurality of points of interest that satisfy the attributes, that has the least similarity to the interest information for the first user is identified, and information about the identified point of interest is provided for display to the first user.

The disclosed subject matter relates to a machine-implemented method for recommending a point of interest that includes obtaining interest information for a first plurality of users, the interest information indicating an interest of each user for a plurality of points of interest, and the plurality of users including a first user, obtaining a plurality of attributes for constraining a search of the plurality of points of interest, identifying a second plurality of users included in the first plurality of users that have respective interest information with the least similarity to the interest information for the first user, identifying a point of interest, from among the plurality of points of interest that satisfy the attributes, that is most popular with the second plurality of users, and providing information about the identified point of interest for display to the first user.

The disclosed subject matter further relates to a system for recommending a location, the system including one or more processors and a machine-readable medium comprising instructions stored therein, which when executed by the processors, cause the processors to perform operations including obtaining interest information for a plurality of users, the interest information including information indicating an interest of each user for a plurality of points of interest, and the plurality of users including a first user, obtaining a plurality of attributes for constraining a search of the plurality of points of interest, identifying a point of interest, from among the plurality of points of interest that satisfy the attributes, that has the least similarity to the interest information for the first user, and providing information about the identified point of interest for display to the first user.

The disclosed subject matter further relates to a system for recommending a location, the system including one or more processors and a machine-readable medium comprising instructions stored therein, which when executed by the processors, cause the processors to perform operations including obtaining interest information for a first plurality of users, the interest information indicating an interest of each user for a plurality of points of interest, and the plurality of users including a first user, obtaining a plurality of attributes for constraining a search of the plurality of points of interest, identifying a second plurality of users included in the first plurality of users that have respective interest information with the least similarity to the interest information for the first user, identifying a point of interest, from among the plurality of points of interest that satisfy the attributes, that is most popular with the second plurality of users, and providing information about the identified point of interest for display to the first user.

The disclosed subject matter also relates to a machine-readable medium comprising instructions stored therein, which when executed by a machine, cause the machine to perform operations including obtaining interest information for a plurality of users, the interest information including information indicating an interest of each user for a plurality of points of interest, and the plurality of users including a first user, obtaining a plurality of attributes for constraining a search of the plurality of points of interest, identifying a point of interest, from among the plurality of points of interest that satisfy the attributes, that has the least similarity to the interest information for the first user, and providing information about the identified point of interest for display to the first user.

The disclosed subject matter also relates to a machine-readable medium comprising instructions stored therein, which when executed by a machine, cause the machine to perform operations including obtaining interest information for a first plurality of users, the interest information indicating an interest of each user for a plurality of points of interest, and the plurality of users including a first user, obtaining a plurality of attributes for constraining a search of the plurality of points of interest, identifying a second plurality of users included in the first plurality of users that have respective interest information with the least similarity to the interest information for the first user, identifying a point of interest, from among the plurality of points of interest that satisfy the attributes, that is most popular with the second plurality of users, and providing information about the identified point of interest for display to the first user.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several aspects of the disclosed subject matter are set forth in the following figures.

FIG. 2A illustrates a user-based process 200 by which recommended points of interest are identified.

FIG. 2B illustrates an item-based process 250 by which recommended points of interest are identified.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Figure 1:
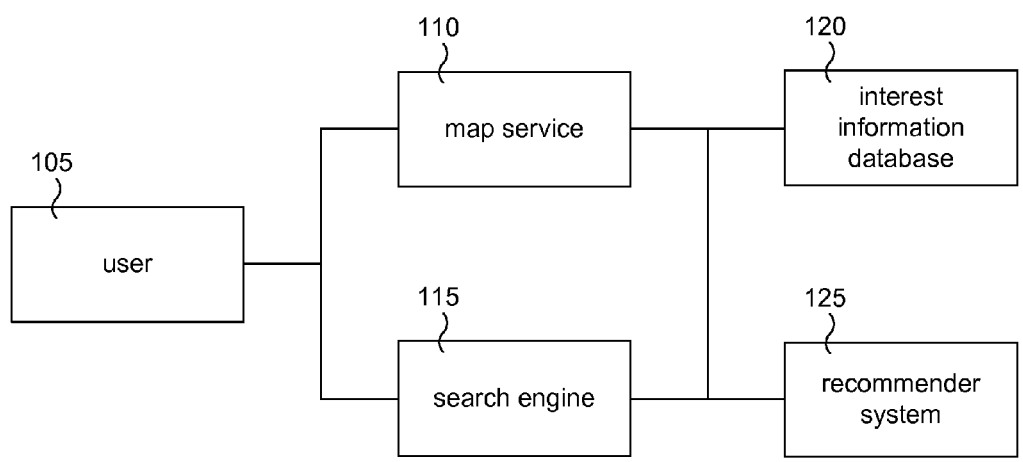
FIG. 1 illustrates an exemplary architecture diagram for the disclosed techniques for recommending points of interest for a user.

FIG. 1 illustrates an exemplary architecture diagram for the disclosed techniques for recommending points of interest for a user 105. User 105 accesses map service 110 via a network connection, such as, but not limited to, the Internet or a mobile data network. User 105 may interact with map service 110 via a computing device, such as, but not limited to, a desktop computer, laptop or tablet computer, or a programmable telephone device. The computing device may provide an interface with map service 110 via a program such as, but not limited to, a web browser or dedicated map software program.

User 105 may also access search engine 115 via the network connection for performing search queries against indexed content, such as webpages available via the Internet.

Interest information database 120 accumulates interest information not only for user 105, but a plurality of users who make use of map service 110, search engine 115, and/or other online services. The interest information may be explicitly or implicitly provided by user 105. An example of explicit interest information is a rating score or a "thumbs up"/"thumbs down" indication provided by user 105. An example of implicit interest information is a record of a number of times that user 105 has reviewed detailed information for a point of interest via map service 110. Interest information expresses not only items of interest to user 105, and potentially the degree of interest, but also may indicate items that user 105 dislikes (which generally is expressly indicated by users). To collect additional interest information about the interests of user 105 with respect to points of interest presented via map service 110, listings or presentations of detailed information for points of interest via map service 110 may include a mechanism by which user 105 may indicate a simple indication of like or dislike of a particular point of interest.

In addition to map service 110, interest information a point of interest may also be obtained based on the use of search engine 115, where it is determined that particular activity by user 105, such as search queries or use of search results, corresponds to the point of interest. Interest information for items other than points of interest may also be obtained via search engine 115 as well. Depending on the particular implementation of recommender system 125, such interest information may be used in order to more effectively classify the similarity of users' overall interests.

In a typical collaborative filtering scenario, there is a list of m users $U=\{u_1, u_2, \ldots, u_m\}$ and a list of n items $I=\{i_1, i_2, \ldots, i_n\}$. Each user $u_i$ has a list of items $I_{ui}$ for which interest information has been obtained. Collaborative filtering algorithms typically represent the entire m×n user/item data as an interest information matrix A, in which each entry $a_{ij}$ represents the interest information of the i-th user on the j-th item. As any particular user is likely to have indicated interest information for only a very small fraction of the universe of items, the interest information database usually is sparsely populated.

In some aspects of the disclosed subject matter, an individual point of interest, or other items tracked by interest information database 120, may have multiple pieces of associated interest information. For example, user 105 may rate a restaurant with respect to multiple characteristics, including, for example, quality of food, quality of service, and atmosphere. As another example, interest information database 120 may record that user 105 viewed detailed information about a particular point of interest, and additionally record a rating score for the same point of interest, if provided by user 105.

Interest information stored in interest information database 120, or other user-generated data obtained via the disclosed systems and techniques, may be considered private by user 105. In an aspect of the disclosed subject matter, such records or information are anonymized and not connected with actual user identities. In an aspect of the disclosed subject matter, users may opt out of the collection of such data; however, this may prevent identification of points of interest dissimilar to the interests of user 105, as they are not recorded. In an aspect of the disclosed subject matter, user 105 may review collected data and remove or modify particular data. In an aspect of the disclosed subject matter, security procedures, such as limiting access to stored information to specified accounts, may be used to restrict access to such information to authorized users or systems.

Recommender system 125, at the request of map service 110, or in some cases search engine 115, identifies points of interest for user 105 based on the interest information recorded in interest information database 120. In some cases recommender system 125 will recommend points of interest based on the interest information of users or groups of users most similar to user 105, or based on interest information for points of interest most similar to those previously of interest to user 105. However, of greater interest for this disclosure is that recommender system 125 is further configured to render recommendations based instead on users or items that are determined to be the most dissimilar from the interest information recorded for user 105.

FIG. 2A illustrates a user-based process 200 by which recommended points of interest are identified. The term "user-based" indicates that the collaborative filtering technique employed by recommender 125 will rely upon determining a degree of similarity between user 105 and other users or groups of users, based on the interest information recorded in interest information database 120 for the users or groups of users. There are many techniques known in the art for determining an index of similarity between users based on their interest data.

One example is by representing the interest data for each user as a vector, and calculating the cosine angle between the vectors. Thus, given user i, whose interest data is represented by vector $\vec{i}$, and user j, whose interest data is represented by vector $\vec{j}$, the similarity of these two users, or $s_{ij}$, is calculated as follows:

$$s_{ij} = \cos\theta = \frac{\vec{i} \cdot \vec{j}}{\|\vec{i}\|\|\vec{j}\|} \quad (1)$$

Another pair of example indices views user interest information as sets of items collected by each user. For user i, $\Gamma_i$ represents the set of objects collected by user i, and $k_i = |\Gamma_i|$ is the "degree" of user i, or the number of objects user i has collected. In the first of the pair of indices, the cosine similarity is calculated as follows:

$$s_{ij} = \frac{|\Gamma_i \cap \Gamma_j|}{\sqrt{k_i \cdot k_j}} \quad (2)$$

In the second pair of indices, the Jaccard similarity is calculated as follows:

$$s_{ij} = \frac{|\Gamma_i \cap \Gamma_j|}{|\Gamma_i \cup \Gamma_j|} \quad (3)$$

Another index, related to equation (2), is known as the common neighbors index, in which two users are considered to be more similar of they have collected more common items. The common neighbors index is calculated as follows:

$$s_{ij} = |\Gamma_i \cap \Gamma_j| \quad (4)$$

Also, dissimilarity $d_{ij}$ can be calculated as the number of different objects that two users have collected:

$$d_{ij} = |\Gamma_i \cup \Gamma_j| - |\Gamma_i \cap \Gamma_j| \quad (5)$$

Each of these may be normalized as follows:

$$\hat{s}_{ij} = \frac{s_{ij}}{\sum_{k=1}^{m} s_{ik}} \quad (6)$$

$$\hat{d}_{ij} = \frac{d_{ij}}{\sum_{k=1}^{m} d_{ik}} \quad (7)$$

Another technique useful for identifying groups of similar users relies upon locality sensitive hashing techniques, that have the desirable property that two data elements have the same hash value with a certain probability that is directly proportional to the similarly between the two data elements. By use of such hashing, users may be grouped into clusters, Then, the similarity of user 105 may be calculated against the clusters of users to determine a degree of similarity between user 105 and each cluster of users. The use of clustering reduces the amount of computation required to find similar or dissimilar users for a particular user 105, at the expense of granularity in identifying such users.

Generally, for determining user similarity all of the interest data available for each user is considered, to assess similarity based on all of the users' recorded interests. However, in some aspects of the disclosed subject matter, items of interest data may be excluded from the interest data. For example, if a recommendation for a restaurant is sought, the interest information used to calculate user similarity may be limited to interest information pertaining to points of interest which are restaurants or interest information pertaining to food interests, to provide a more focused assessment of similarity.

The above examples are among many algorithms known in the art for calculating the similarity of users based on collected interest information which may be used for implementing the disclosed subject matter.

In step 205, interest information database 120 obtains and stores interest information for user 105 and other users regarding points of interest. As discussed previously, this interest information may be obtained from map service 110, search engine 115, or other online services. The collection of this interest information occurs over time, and before the search corresponding to step 210 begins. The obtained interest information is subject to privacy protections, as discussed previously.

In step 210, recommendation system 125 obtains attributes to constrain a search for points of interest tracked by interest information database 120. For example, although user 105 may be interested in a new and different dining experience, there may be geographical constraints (such as cities or other geographical areas to which a search should be limited), a ceiling on an expected price of a meal, and minimum levels of food quality and service that the user wishes to ensure are observed. These constraints may be used to filter out points of interest that do not satisfy the obtained constraints, either before or after performing collaborative filtering, based on related information included in interest information database 120 or available through, for example, map service 110.

In step 215, a plurality of dissimilar users are identified based on the interest information recorded for user 105. Many indexing formulas are known in the art for determining a degree of similarity between users, including the examples discussed above (e.g., cosine angle, cosine similarity, Jaccard similarity, and locality sensitive hashing). In contrast to conventional collaborative filter techniques in which the users or clusters of users with the greatest degree of similarity are identified, the disclosed subject matter instead identifies the users or clusters of users with the lowest degree of similarity with user 105, or, in other words, the users or clusters of users that are most dissimilar to user 105. The interest information obtained from users dissimilar to user 105 should be useful in identifying points of interest that are different from the established interests of user 105 as indicated by the interest information recorded in interest information database 120.

It is common for little or no interest information to be obtained and stored by interest information database 120 for some portion of the users tracked via interest information database 120. Accordingly, such users, or clusters including such users, are likely to be designated as dissimilar from user 105. However, as little or no useful interest information is provided by these users, they may be excluded from consideration while performing collaborative filtering, and/or removed from any results of collaborative filtering, so that higher-quality interest information from more active users is used instead. One example of a technique for filtering such users is to exclude users with less than a predetermined amount or quality of interest information recorded in interest information database.

In step 220, a point of interest which is the most popular with the dissimilar users identified in step 215 among points of interest satisfying the attributes obtained in step 210 is identified, although multiple points of interest may be identified. To do this, a score is calculated for each of the α points of interest not collected by user 105 with reference to the interest information recorded for the t number of users identified in step 215 in a manner similar to the following equation:

$$p_{i,\alpha} = \sum_{j=1}^{t} d_{ij} \cdot a_{j\alpha} \quad (8)$$

Where similarity index $s_{ij}$ is used instead of dissimilarity $d_{ij}$, $d_{ij}$ can be substituted with, for example, the following:

$$d_{ij} = 1 + \min(s_{i1}, s_{i2}, \ldots, s_{it}) - s_{ij} \quad (9)$$

With this, the lower the value of $s_{ij}$, the closer the value $d_{ij}$ will be to 1. Optionally, the similarity values may be normalized to ensure $d_{ij}$ has a value between 0 and 1.

Then the α points of interest are ranked according to their respective scores $p_{1,a}$, and presented to user 105 via map service 110. The result of process 200 is that the most popular points of interest for the users most dissimilar to user 105 are identified, thereby providing novel, and hopefully interesting, points of interest that fall outside of the interest information recorded for user 105.

FIG. 2B illustrates an item-based process 250 by which recommended points of interest are identified. The term "item-based" indicates that the collaborative filtering technique employed by recommender 125 will rely upon determining a degree of similarity between pairs of items, which is used to identify items similar to those previously collected by user 105, as indicated by the interest information stored in interest information database 120. In an aspect of the disclosed subject matter, computing the similarity of a pair of items i and j begins with identifying the set U of users for which interest information is recorded for both items i and j. Many techniques are known in the art for calculating the similarity of the items based on the interest information recorded for the users in U. For example, the cosine angle technique shown in equation (1) above serves as a suitable similarity index.

In another aspect, a similarity index, referred to as correlation-based similarity, is employed, which calculates the similarity $s_{ij}$ as follows:

$$s_{ij} = \frac{\sum_{u \in U}(a_{u,i} - \bar{a}_i)(a_{u,j} - \bar{a}_j)}{\sqrt{\sum_{u \in U}(a_{u,i} - \bar{a}_i)^2} \sqrt{\sum_{u \in U}(a_{u,j} - \bar{a}_j)^2}} \quad (10)$$

Where $a_{u,i}$ denotes the interest information of user u on item i, and $\bar{a}_i$ is the average value of the interest information of the i-th item.

In another aspect, a similarity index, referred to as adjusted cosine similarity, is employed, which calculates the similarity $s_{ij}$ as follows:

$$s_{ij} = \frac{\sum_{u \in U}(a_{u,i} - \bar{a}_u)(a_{u,j} - \bar{a}_u)}{\sqrt{\sum_{u \in U}(a_{u,i} - \bar{a}_u)^2} \sqrt{\sum_{u \in U}(a_{u,j} - \bar{a}_u)^2}} \quad (11)$$

Where $a_{u,i}$ denotes the interest information of user u on item i, and $\bar{a}_u$ is the average value of the interest information for the u-th user.

The above examples are among many algorithms known in the art for calculating the similarity of items based on collected user interest information which may be used for implementing the disclosed subject matter.

In step 255, interest information database 120 obtains and stores interest information for user 105 and other users regarding points of interest. As discussed previously, this interest information may be obtained from map service 110, search engine 115, or other online services. The collection of this interest information occurs over time, and before the search corresponding to step 260 begins. The obtained interest information is subject to privacy protections, as discussed previously.

In step 260, recommendation system 125 obtains attributes constraining a search for points of interest tracked by interest information database 120. For example, although user 105 may be interested in a new and different dining experience, there may be geographical constraints (such as cities or other geographical areas to which a search should be limited), a ceiling on an expected price of a meal, and minimum levels of food quality and service that the user wishes to ensure are observed. These constraints may be used to filter out points of interest that do not satisfy the obtained constraints, either before or after performing collaborative filtering, based on related information included in interest information database 120 or available through, for example, map service 110.

In step 265, recommendation system 125 identifies a point of interest that satisfies the attributes obtained in step 260 and that are most dissimilar to the interest information recorded for user 105, although multiple points of interest may be identified. For each point of interest i not collected by user 105, its similarity is calculated against each point of interest collected by user 105. The calculated similarities are used to identify set J of the k collected points of interest which are least similar (e.g., most dissimilar) to uncollected point of interest i. From this, a value for point of interest i is calculated as follows:

$$p_{u,i} = \frac{\sum_{j \in J} a_{u,j} * d_{ij}}{\sum_{j \in J} d_{ij}} \quad (12)$$

Where $a_{u,j}$ is the value of the interest information for user 105 for the j-th item in the set J of most dissimilar points of interest. As discussed with respect to equation (9) above, dissimilarity $d_{ij}$ can be derived from a similarity $s_{ij}$. In some aspects of the disclosed subject matter, the term au,j may be excluded and/or the interest information from other users may be used for ranking the dissimilar points of interest. The uncollected points of interest are ranked according to their respective scores $p_{u,i}$ and presented in rank order to user 105 via map service 110.

As would be appreciated by those skilled in the art, the above concepts may be extended to many recommendation techniques which rely on identifying the "closest" or most similar items in an item space, by adapting such techniques to instead identify the "furthest" or most dissimilar items instead.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 3:
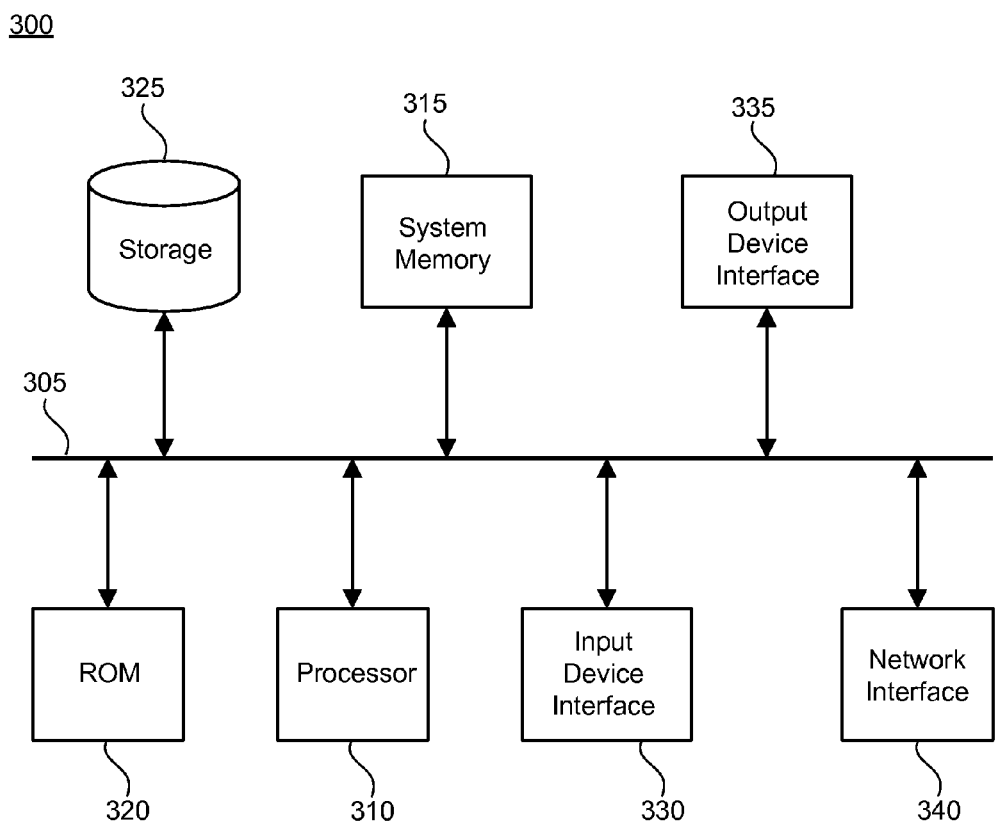
FIG. 3 conceptually illustrates an electronic system 300 with which some implementations of the subject technology are implemented.

FIG. 3 conceptually illustrates an electronic system 300 with which some implementations of the subject technology are implemented. The electronic system 300 can be a computer, phone, PDA, or any other sort of electronic device. Such an electronic system includes various types of computer readable media and interfaces for various other types of computer readable media. Electronic system 300 includes a bus 305, processing unit(s) 310, a system memory 315, a read-only memory 320, a permanent storage device 325, an input device interface 330, an output device interface 335, and a network interface 340.

The bus 305 collectively represents all system, peripheral, and chipset buses that communicatively connect the numerous internal devices of the electronic system 300. For instance, the bus 305 communicatively connects the processing unit(s) 310 with the read-only 320, the system memory 315, and the permanent storage device 325.

From these various memory units, the processing unit(s) 310 retrieves instructions to execute and data to process in order to execute the processes of the invention. The processing unit(s) can be a single processor or a multi-core processor in different implementations.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some implementations of the invention use a mass-storage device (such as a magnetic or optical disk and its corresponding disk drive) as the permanent storage device 325.

Other implementations use a removable storage device (such as a floppy disk, flash drive, and its corresponding disk drive) as the permanent storage device 325. Like the permanent storage device 325, the system memory 315 is a read-and-write memory device. However, unlike storage device 325, the system memory 315 is a volatile read-and-write memory, such a random access memory. The system memory 315 stores some of the instructions and data that the processor needs at runtime. In some implementations, the invention's processes are stored in the system memory 315, the permanent storage device 325, and/or the read-only memory 320. For example, the various memory units include instructions for processing multimedia items in accordance with some implementations. From these various memory units, the processing unit(s) 310 retrieves instructions to execute and data to process in order to execute the processes of some implementations.

The bus 305 also connects to the input and output device interfaces 330 and 335. The input device interface 330 enables the user to communicate information and select commands to the electronic system. Input devices used with input device interface 330 include, for example, alphanumeric keyboards and pointing devices (also called "cursor control devices"). Output device interfaces 335 enables, for example, the display of images generated by the electronic system 300.

Output devices used with output device interface 335 include, for example, printers and display devices, such as cathode ray tubes (CRT) or liquid crystal displays (LCD). Some implementations include devices such as a touchscreen that functions as both input and output devices.

Finally, as shown in FIG. 3, bus 305 also couples electronic system 300 to a network (not shown) through a network interface 340. In this manner, the computer can be a part of a network of computers (such as a local area network ("LAN"), a wide area network ("WAN"), or an Intranet, or a network of networks, such as the Internet. Any or all components of electronic system 300 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for recommending a point of interest, the method comprising:
    obtaining interest information for a plurality of users, including a first user, wherein the interest information for each of the plurality of users indicates that user's interest in a plurality of points of interest;
    obtaining a plurality of attributes for constraining a search of the plurality of points of interest;
    identifying, from among the plurality of points of interest and based on the interest information for the plurality of users, a point of interest that satisfies the attributes and that has the least similarity to the interest information for the first user; and
    providing information about the identified point of interest for display to the first user,
    wherein identifying the point of interest that satisfies the attributes and that has the least similarity to the interest information for the first user is based on the equation:

$$p_{u,i} = \frac{\sum_{j \in J} a_{u,j} * d_{ij}}{\sum_{j \in J} d_{ij}}$$

wherein i represents a point of interest not collected by the first user, $p_{u,i}$ represents a score for the first user for point of interest i, $d_{ij}$ represents a dissimilarity between points of interest i and j, $a_{u,j}$ represents interest information for the first user for point of interest j, and J represents a set of most dissimilar points of interest.

2. The machine-implemented method of claim 1, wherein the interest information includes interest information obtained via an online map service and interest information obtained via an online search engine.

3. The machine-implemented method of claim 1, wherein the interest information further includes interest information for items other than the plurality of points of interest.

4. The machine-implemented method of claim 1, wherein the attributes include one or more of the following:
    a geographical area to which recommended points of interest are to be limited,
    a ceiling on an expected price of a meal,
    a minimum quality of food, and
    a minimum quality of service.

5. The machine-implemented method of claim 1, wherein identifying a point of interest that satisfies the attributes and that has the least similarity to the interest information for the first user further comprises:
    identifying a subset of the plurality of points of interest that satisfy the attributes and for which no interest information has been obtained from the first user;
    determining a similarity between each point of interest in the subset and the interest information for the first user; and
    identifying a point of interest in the subset having the least similarity as the point of interest that satisfies the attributes and that has the least similarity to the interest information for the first user.

6. A machine-implemented method for recommending a point of interest, the method comprising:
    obtaining interest information for a plurality of users, including a first user, wherein the interest information for each of the plurality of users indicates that user's interest in a plurality of points of interest;
    obtaining a plurality of attributes for constraining a search of the plurality of points of interest;
    identifying, based on the interest information for the plurality of users, a subset of the plurality of users included in the plurality of users that have respective interest information with the least similarity to the interest information for the first user;
    identifying, from among the plurality of points of interest that satisfy the attributes, a point of interest that is most popular with the subset of the plurality of users; and
    providing information about the identified point of interest for display to the first user,
    wherein identifying the point of interest that is most popular with the subset of the plurality of users is based on the equation:

$$p_{i,\alpha} = \sum_{j=1}^{t} d_{ij} \cdot a_{j\alpha}$$

wherein α represents a point of interest not collected by the first user, $p_{i,\alpha}$ represents a score for the first user for point of interest α, t represents a number of users within the subset, $d_{ij}$ represents dissimilarity between the first user and a user j, and $a_{j\alpha}$ represents interest information for user j for point of interest α.

7. The machine-implemented method of claim 6, wherein the interest information includes interest information obtained via an online map service and interest information obtained via an online search engine.

8. The machine-implemented method of claim 6, wherein the interest information further includes interest information for items other than the plurality of points of interest.

9. The machine-implemented method of claim 6, wherein the attributes include one or more of the following:

a geographical area to which recommended points of interest are to be limited,
a ceiling on an expected price of a meal,
a minimum quality of food, and
a minimum quality of service.

10. A system for recommending a location, the system comprising:
one or more processors; and
a machine-readable medium comprising instructions stored therein, which when executed by the processors, cause the processors to perform operations comprising:
obtaining interest information for a plurality of users, including a first user, wherein the interest information for each of the plurality of users indicates that user's interest in a plurality of points of interest;
obtaining a plurality of attributes for constraining a search of the plurality of points of interest;
identifying, from among the plurality of points of interest and based on the interest information for the plurality of users, a point of interest that satisfies the attributes and that has the least similarity to the interest information for the first user; and
providing information about the identified point of interest for display to the first user,
wherein identifying the point of interest that satisfies the attributes and that has the least similarity to the interest information for the first user is based on the equation:

$$pu, i = \frac{\sum_{j \in J} a_{u,j} * d_{ij}}{\sum_{j \in J} d_{ij}}$$

wherein i represents a point of interest not collected by the first user, $p_{u,i}$ represents a score for the first user for point of interest i, $d_{ij}$ represents a dissimilarity between points of interest i and j, $a_{u,j}$ represents interest information for the first user for point of interest j, and J represents a set of most dissimilar points of interest.

11. The system of claim 10, wherein the interest information includes interest information obtained via an online map service and interest information obtained via an online search engine.

12. The system of claim 10, wherein the interest information further includes interest information for items other than the plurality of points of interest.

13. The system of claim 10, wherein the attributes include one or more of the following:
a geographical area to which recommended points of interest are to be limited,
a ceiling on an expected price of a meal,
a minimum quality of food, and
a minimum quality of service.

14. A system for recommending a location, the system comprising:
one or more processors; and
a machine-readable medium comprising instructions stored therein, which when executed by the processors, cause the processors to perform operations comprising:
obtaining interest information for a plurality of users, including a first user, wherein the interest information for each of the plurality of users indicates that user's interest in a plurality of points of interest;
obtaining a plurality of attributes for constraining a search of the plurality of points of interest;
identifying, based on the interest information for the plurality of users, a subset of the plurality of users that have respective interest information with the least similarity to the interest information for the first user;
identifying, from among the plurality of points of interest that satisfy the attributes, a point of interest that is most popular with the subset of the plurality of users; and
providing information about the identified point of interest for display to the first user,
wherein identifying the point of interest that is most popular with the subset of the plurality of users is based on the equation:

$$p_{i,\alpha} = \sum_{j=1}^{t} d_{ij} \cdot a_{j\alpha}$$

wherein α represents a point of interest not collected by the first user, $p_{i,\alpha}$ represents a score for the first user for point of interest α, t represents a number of users within the subset, $d_{ij}$ represents dissimilarity between the first user and a user j, and $a_{j\alpha}$ represents interest information for user j for point of interest α.

15. The system of claim 14, wherein the interest information includes interest information obtained via an online map service and interest information obtained via an online search engine.

16. The system of claim 14, wherein the interest information further includes interest information for items other than the plurality of points of interest.

17. The system of claim 14, wherein the attributes include one or more of the following:
a geographical area to which recommended points of interest are to be limited,
a ceiling on an expected price of a meal,
a minimum quality of food, and
a minimum quality of service.

18. A non-transitory machine-readable medium comprising instructions stored therein, which when executed by a machine, cause the machine to perform operations comprising:
obtaining interest information for a plurality of users, including a first user, wherein the interest information for each of the plurality of users indicates that user's interest in a plurality of points of interest;
obtaining a plurality of attributes for constraining a search of the plurality of points of interest;
identifying, from among the plurality of points of interest and based on the interest information for the plurality of users, a point of interest that satisfies the attributes and that has the least similarity to the interest information for the first user; and
providing information about the identified point of interest for display to the first user,
wherein identifying the point of interest that satisfies the attributes and that has the least similarity to the interest information for the first user is based on the equation:

$$pu, i = \frac{\sum_{j \in J} a_{u,j} * d_{ij}}{\sum_{j \in J} d_{ij}}$$

wherein i represents a point of interest not collected by the first user, $p_{u,i}$ represents a score for the first user for point of interest i, $d_{ij}$ represents a dissimilarity between points of interest i and j, $a_{u,j}$ represents interest information for the first user for point of interest j, and J represents a set of most dissimilar points of interest.

19. The non-transitory machine-readable medium of claim 18, wherein the interest information includes interest information obtained via an online map service and interest information obtained via an online search engine.

20. The non-transitory machine-readable medium of claim 18, wherein the interest information further includes interest information for items other than the plurality of points of interest.

21. The non-transitory machine-readable medium of claim 18, wherein the attributes include one or more of the following:
- a geographical area to which recommended points of interest are to be limited,
- a ceiling on an expected price of a meal,
- a minimum quality of food, and
- a minimum quality of service.

22. A non-transitory machine-readable medium comprising instructions stored therein, which when executed by a machine, cause the machine to perform operations comprising:
- obtaining interest information for a plurality of users, including a first user, wherein the interest information for each of the plurality of users indicates that user's interest in a plurality of points of interest, and the plurality of users including a first user;
- obtaining a plurality of attributes for constraining a search of the plurality of points of interest;
- identifying, based on the interest information for the plurality of users, a subset of the plurality of users that have respective interest information with the least similarity to the interest information for the first user;
- identifying, from among the plurality of points of interest that satisfy the attributes, a point of interest that is most popular with the subset of the plurality of users; and
- providing information about the identified point of interest for display to the first user,
- wherein identifying the point of interest that is most popular with the subset of the plurality of users is based on the equation:

$$p_{i,\alpha} = \sum_{j=1}^{t} d_{ij} \cdot a_{j\alpha}$$

wherein α represents a point of interest not collected by the first user, $p_{i,\alpha}$ represents a score for the first user for point of interest α, t represents a number of users within the subset, $d_{ij}$ represents dissimilarity between the first user and a user j, and $a_{j\alpha}$ represents interest information for user j for point of interest α.

23. The non-transitory machine-readable medium of claim 22, wherein the interest information includes interest information obtained via an online map service and interest information obtained via an online search engine.

24. The non-transitory machine-readable medium of claim 22, wherein the interest information further includes interest information for items other than the plurality of points of interest.

25. The non-transitory machine-readable medium of claim 22, wherein the attributes include one or more of the following:
- a geographical area to which recommended points of interest are to be limited,
- a ceiling on an expected price of a meal,
- a minimum quality of food, and
- a minimum quality of service.

26. A machine-implemented method for recommending a point of interest, the method comprising:
- obtaining interest information for a plurality of users, including a first user, wherein the interest information for each of the plurality of users indicates that user's interest in a plurality of points of interest;
- obtaining a plurality of attributes for constraining a search of the plurality of points of interest;
- identifying, from among the plurality of points of interest and based on the interest information for the plurality of users, a point of interest that satisfies the attributes and that has the least similarity to the interest information for the first user;
- providing information about the identified point of interest for display to the first user,
- wherein identifying a point of interest that satisfies the attributes and that has the least similarity to the interest information for the first user further comprises:
  - identifying a subset of the plurality of points of interest that satisfy the attributes and for which no interest information has been obtained from the first user;
  - determining a similarity between each point of interest in the subset and the interest information for the first user; and
  - identifying a point of interest in the subset having the least similarity as the point of interest that satisfies the attributes and that has the least similarity to the interest information for the first user, and
- wherein determining a similarity between each point of interest in the subset and the interest information for the first user further comprises:
  - determining, for a first point of interest in the subset, similarity scores between the first point of interest and points of interest for which interest information has been obtained for the first user; and
  - computing a weighted average of the similarity scores, wherein the weights are determined from the interest information for the points of interest for which interest information has been obtained for the first user.

* * * * *